United States Patent
Maier

(10) Patent No.: US 6,715,386 B2
(45) Date of Patent: Apr. 6, 2004

(54) TURNING METHOD

(75) Inventor: Johann Maier, Pflach (AT)

(73) Assignee: Plansee Tizit Aktiengesellschaft, Reutte (AT)

(*) Notice: Subject to any disclaimer, the term of this patent is extended or adjusted under 35 U.S.C. 154(b) by 0 days.

(21) Appl. No.: 10/151,089

(22) Filed: May 20, 2002

(65) Prior Publication Data

US 2002/0170396 A1 Nov. 21, 2002

(30) Foreign Application Priority Data

May 18, 2001 (AT) ............................................. 407/01 U

(51) Int. Cl.⁷ .................................................. B23B 1/00
(52) U.S. Cl. ......................................... 82/1.11; 82/159
(58) Field of Search .......................... 82/1.11, 159, 117, 82/132, 123; 408/35; 29/35.5, 36, 39, 40

(56) References Cited

U.S. PATENT DOCUMENTS

| | | | |
|---|---|---|---|
| 3,725,987 A | | 4/1973 | Kurimoto et al. |
| 4,180,894 A | * | 1/1980 | Link ........................... 82/1.11 |
| 4,296,657 A | * | 10/1981 | Yasuba et al. ................. 82/2.5 |
| 4,683,626 A | | 8/1987 | Steiner |
| 4,827,814 A | * | 5/1989 | Wilkins ....................... 82/1.11 |

FOREIGN PATENT DOCUMENTS

| | | |
|---|---|---|
| DE | 26 37 792 A1 | 2/1978 |
| DE | 34 04 868 A1 | 8/1985 |
| EP | 0 516 103 A1 | 12/1992 |
| EP | 0 538 515 B1 | 4/1993 |
| EP | 0 679 463 A1 | 11/1995 |

* cited by examiner

Primary Examiner—Willmon Fridie, Jr.
(74) Attorney, Agent, or Firm—Laurence A. Greenberg; Werner H. Stemer; Ralph E. Locher

(57) ABSTRACT

The novel turning method on a lathe or a machining apparatus uses a tool head which is traversable for the machining and can be rotated mechanically in a receiver with a rotary axis D in the course of the machining. The rotary axis D of the tool head lies within an angular range $\alpha$ of 45° to 90° to the X-axis and perpendicularly to the Z-axis of the machining apparatus. In addition, a tool head is used whose cutting inserts are arranged in such a way that each cutting insert has a tool reference plane $P_r$ through in each case identical selected cutting-edge points perpendicularly to the assumed cutting direction in accordance with DIN 6581, this tool reference plane $P_r$ running within an angular range $\beta$ of 90° to 135° to the rotary axis D of the tool head.

8 Claims, 8 Drawing Sheets

TURNING METHOD

BACKGROUND OF THE INVENTION

Field of the Invention

The invention relates to a turning method on a lathe or a machining apparatus using a tool head which, for the machining, can be rotated mechanically in a receptacle with a rotary axis D in the course of the machining and, with or without the use of individual tool holders, is fitted with one or more cutting inserts that are used individually during the machining.

It is characteristic of all turning operations that the cutting movement for the machining is carried out by the workpiece. To this end, the workpiece is clamped in the spindle receptacle of a lathe or a machining apparatus and set in rotation. Depending on the design of the lathe, the feed and infeed movements of the cutting tool for machining the workpiece are performed solely by moving the cutting tool or by a movement of the lathe spindle with the clamped workpiece alone or combined with a movement of the cutting tool.

The relative positional changes of the cutting tool which are possible during turning are identified by standardized axis designations, the basic position of the axis definition being the right-hand, right-angled coordinate system with the axes X, Y and Z, which is referenced to the main guideways of the machine tool.

The axis which coincides with the rotary axis of the workpiece or runs parallel to this rotary axis is established as the Z-axis, while the axis which is perpendicular to the Z-axis, and which is the main axis in the positioning plane parallel to the workpiece mounting plane, is established as the X-axis. Depending on the design of the lathe, whether it is a flat-bed or inclined-bed design, the plane determined by the X-axis and Z-axis runs horizontally or inclined. The position of the Y-axis is automatically obtained from the definition according to the right-hand, right-angled coordinate system by the establishing of the X-axis and Z-axis.

If the feed movement of the cutting tool takes place in the direction of the Z-axis and the infeed movement takes place in the direction of the X-axis, this involves longitudinal turning, whereas facing is carried out with a feed movement in the direction of the X-axis and an infeed movement in the direction of the Z-axis. Even during the machining of relatively simple workpieces, it is necessary for efficient machining to combine facing and longitudinal turning with one another in each case in the two possible directions, which as a rule is feasible only with the use of a plurality of different cutting tools. To produce complex shaped workpieces with special configurations, such as shoulders, spherical surface sections, or special configurations of bores, an even greater number of different cutting tools are necessary, which as a rule are used one after the other.

There are standardized tool reference systems for the clear definition and description of the angles at the cutting-edge part of a cutting tool. Thus, for example in cutting tools according to DIN 6581 (German Industrial Standard), a plane through a selected point of the cutting edge perpendicular to the assumed cutting direction occurring in the position of use of the cutting edge is established as tool reference plane $P_r$.

Cutting tools nowadays, virtually without exception, consist of cutting inserts in the form of indexable cutting tips of different cutting materials with diverse geometries, these indexable cutting tips as a rule being positioned individually in individually adapted tool holders or tool heads while taking into account the machining angles required during the cutting action, such as setting angle, clearance angle and rake angle.

In simple lathes, as a rule up to a maximum of four of these tool holders are arranged so as to be offset by 90° from one another in a tool receptacle, with which they can be brought into use one after the other as required by manual rotation of the tool receptacle.

In more complex automated lathes, the different tool holders are clamped in "tool turrets", with which the individual tool holders are brought into use in a specific manner by mechanical rotation of the tool turret about a rotary axis. In ultramodern turning or machining apparatuses, which often work with two opposite work spindles which can be driven independently of one another, two tool turrets are often used, and these tool turrets can be traversed in front of and behind the work spindles in each case in the direction of the X-axis and Z-axis and can also be rotated with a rotary axis parallel to the Z-axis. The individual tool holders are either rigidly fastened to the end face of the tool turret in certain angular sections or are also often fastened in a rotatable manner via special rotationally symmetrical receptacles at certain angular distances to the end face or to the circumferential surface of the tool turret. Thus such rotationally symmetrical tool receptacles may also be designed such that they can be driven mechanically, so that drilling and milling tools may also be accommodated by the tool turret and thus the range of machining operations on the lathe or on the machining apparatus is expanded.

The disadvantage with these fully automated lathes or machining apparatuses using tool turrets lies in the fact that the position of the individual tool holders cannot be varied in such a way that different setting angles of the indexable cutting tips during the turning with a tool holder can be set, so that, even for pure turning, a multiplicity of different tools having receptacles adapted to the different setting angles of the indexable cutting tips may still be necessary for a large number of different forms of indexable cutting tip. Since, here too, each indexable cutting tip is as a rule arranged individually in a separate tool holder, the tool turret provided for accommodating these tool holders must be of a large design and becomes very heavy as a result. This large mass must be moved rapidly and precisely, which can only be effected with a very large design outlay and thus makes this type of lathe very expensive.

Machining apparatuses with separate milling attachments are also known, in which, in addition to pure turning and limited drilling and milling operations, the possibilities for extended milling or drilling operations are thus also provided. These milling attachments are traversable in the X-direction and Z-direction of the machining apparatus, the milling spindle, with a rotary axis D, rotating or being rotatable in an infinitely variable manner parallel to the X-Z plane and also being pivotable about the Y-axis. In addition, varied milling and/or drilling operations can be carried out on the workpiece with such a milling attachment.

For such a milling attachment, for accommodating in the milling spindle, a rotationally symmetrical tool head for turning is known, this tool head having four different indexable cutting tips which can be brought into use one after the other by specific mechanical rotation of the tool head in the milling spindle.

In this case, the indexable cutting tips are arranged about the rotary axis D of the tool head in such a way that the individual tool reference planes $P_r$ each run so as to be offset from one another by 90° and parallel to the rotary axis D. During turning with such a tool head, although different indexable cutting tips can be brought into use one after the other, variation of the setting angle of the individual indexable cutting tips is only possible to a limited extent due to the specific arrangement of the indexable cutting tips in the tool head. As a result, it is also not possible with such a tool to carry out different turning operations such as longitudinal turning and facing, in each case in both directions, with a single indexable cutting tip by specific variation of the setting angle.

SUMMARY OF THE INVENTION

It is accordingly an object of the invention to provide a method for machine turning using a tool head, which overcomes the above-mentioned disadvantages of the heretofore-known devices and methods of this general type and in which turning method a plurality of different turning operations, such as, for example, longitudinal turning and facing, at various setting angles of the cutting inserts can also be carried out even with the use of a single cutting insert in virtually any conventional form. At the same time, the moving masses for the positioning of the respectively required cutting insert are to decrease markedly compared with prior art methods, so that the outlay in terms of drive and control engineering can be made substantially more cost-effective.

With the foregoing and other objects in view there is provided, in accordance with the invention, a turning method, which comprises:

providing a lathe or a machining apparatus with a tool head, the tool head being traversible along an X-axis and a Z-axis of the lathe or machining apparatus and rotatable about a rotary axis in the course of a turning operation;

defining the rotary axis D of the tool head within an angular range α of 45° to 90° relative to the X-axis and perpendicular to the Z-axis of the lathe or machining apparatus;

providing the tool head with one or more cutting inserts for individual use during the turning operation, and arranged such that each cutting insert has a tool reference plane $P_r$ through in each case identically selected cutting-edge points perpendicularly to an assumed cutting direction in accordance with DIN 6581, the tool reference plane $P_r$ enclosing an angle β of 90° to 135° with the rotary axis D of the tool head; and turning a workpiece with a cutting insert on the tool head.

In other words, the objects of the invention are achieved in that the method is carried out on a lathe or a machining apparatus in which the rotary axis D of the tool head lies within an angular range α of 45° to 90° to the X-axis and perpendicularly to the Z-axis of the machining apparatus, and in that a tool head is used whose cutting inserts are arranged in such a way that each cutting insert has a tool reference plane $P_r$ through in each case identical selected cutting-edge points perpendicularly to the assumed cutting direction in accordance with DIN 6581, this tool reference plane $P_r$ running within an angular range β of 90° to 135° to the rotary axis D of the tool head.

By such a completely novel, rotatable arrangement of the tool head and of the cutting inserts thus fitted, the setting angle required during the cutting action, in each cutting insert in use, can be continuously adapted in a specific manner to the respective location to be machined by rotating the tool head about its rotary axis D, so that different tools or cutting inserts for longitudinal turning from left to right, or in the opposite direction, and for facing, likewise in both directions, can be avoided. All of these different turning operations can be carried out equally effectively with a single cutting insert or tool.

The tool head may be fitted with one cutting insert or with a plurality of identical cutting inserts, which, after a cutting insert has worn out, are brought into use one after the other by rotating the tool head about its rotary axis D. For special machining operations, cutting inserts having different geometries can also be provided in the same tool head in order to extend even further the range of applications.

An arrangement of the tool head having a rotary axis D which encloses an angle α of less than 90° with the X-axis may be advantageous when very large workpieces are to be machined. In these cases, the cutting-edge height is varied by rotating the tool head about the rotary axis D and has to be corrected by traversing the tool head in the direction of the Y-axis.

The rotary axis D of the tool head therefore advantageously encloses an angle α of 90° with the X-axis. If the tool head is fitted with a plurality of cutting inserts, the latter are preferably arranged in such a way that the tool reference planes $P_r$ of the individual cutting inserts coincide in a common tool reference plane $P_r$ which runs at an angle β of 90° to the rotary axis D of the tool head. In this way, when the cutting insert is changed, correction of the tool head in the direction of the Y-axis for correctly establishing the cutting height can be dispensed with by rotating the tool head.

It may likewise be advantageous to arrange the cutting inserts in such a way that the tool reference planes $P_r$ of the individual cutting inserts coincide in different, common tool reference planes $P_r$ arranged in parallel one above the other with respect to the rotary axis D. In this way, an especially large number of cutting inserts can be arranged in a space-saving manner, as a result of which the tool head can be of very compact design even when using many cutting inserts.

It is likewise advantageous if the machining apparatus, for fitting with a plurality of tool heads according to the invention, has a plurality of receptacles which can be brought into the working position one after the other, as a result of which the machining apparatus can be fitted in a simple manner with a multiplicity of identical or even different cutting inserts, with or without tool holders, without excessively large masses having to be moved.

In a further configuration in this respect, even tool heads already fitted beforehand may then be automatically removed from a suitable tool magazine and exchanged.

In order to accommodate the corresponding tool heads, the lathes or machining apparatuses for carrying out the method according to the invention need only be equipped with one or more, as far as possible universally traversable receptacles which can be mechanically rotated in fine steps or in an infinitely variable manner and have a rotary axis D within an angular range of 45° to 90° to the X-axis, which rotary axis D can also be oriented perpendicularly to the Z-axis of the machining center. Since the masses of the tool heads are extremely small, the drives for traversing and rotating the receptacles, compared with previous attachments in which individual cutting tools are mounted with a separate tool holder on turrets of large volume, can be kept markedly more compact and simpler. The movement of the tool head in the receptacle can be effected more rapidly and more precisely with little outlay. When designing these drives, care is merely to be taken to ensure that the forces occurring during the cutting action can be completely absorbed.

If the drive for accommodating the tool head is provided in such a way that the tool head is not only rotatable but can also be moved at a high rotary speed, milling operations can also be carried out when using a milling tool as tool head.

Other features which are considered as characteristic for the invention are set forth in the appended claims.

Although the invention is illustrated and described herein as embodied in a turning method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
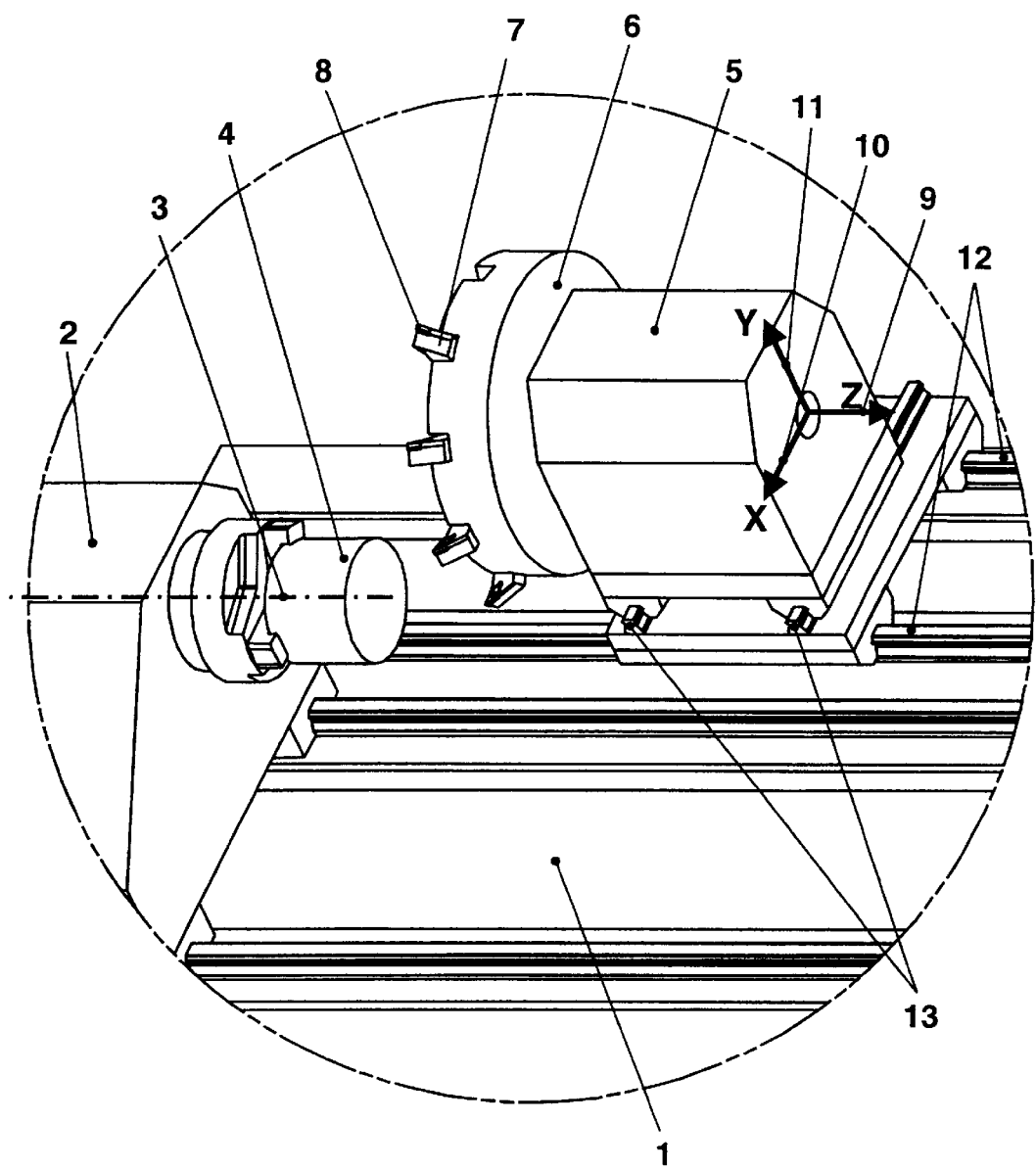
FIG. 1 is a perspective diagrammatic representation of an inclined-bed lathe according to the prior art which works according to the prior art method.

Referring now to the figures of the drawing in detail and first, particularly, to FIG. 1 thereof, there is shown a prior art inclined-bed lathe that includes an inclined machine bed 1, a headstock 2 with a work spindle and a clamping fixture for holding a workpiece 4. The clamping fixture rotates about a spindle axis 3, and a tool slide 5 accommodates a tool turret 6 with various tool holders 7 having cutting inserts 8 for machining the workpiece 4. A Z-axis 9 of the lathe lies parallel to the spindle axis 3. An X-axis 10, the main axis in the positioning plane, lies radially to the axis of the workpiece 4. A Y-axis 11 results automatically according to the definition of the right-hand, right-angled coordinate system. The tool slide 5 is traversable in the direction of the Z-axis 9 on corresponding guides 12 of the machine bed 1. Via guides 13, the tool slide 5 is traversable in the direction of the X-axis 10. The tool turret 6 fastened to the tool slide 5 at the end face is rotatable about the Z-axis 9, so that the tool holder 7 required for the respective turning operation and with cutting insert 8 clamped in place can be brought into the working position. Since the tool holders 7 are fastened rigidly in the tool turret 6, for turning operations which require a changed setting angle of the cutting insert 8, it is necessary to bring the corresponding tool holder 7 which has the cutting insert 8 with the desired setting angle into the working position by rotating the tool turret 6. Since each cutting insert 8 is mounted on a separate tool holder 7, the tool turret 6 must be designed with a correspondingly large volume. The moving masses are therefore large and the drive units for the tool turret must be of correspondingly powerful design. Combined with the need for a rapid and precise movement of the tool turret 6, a correspondingly high design outlay is necessary.

Figure 2:
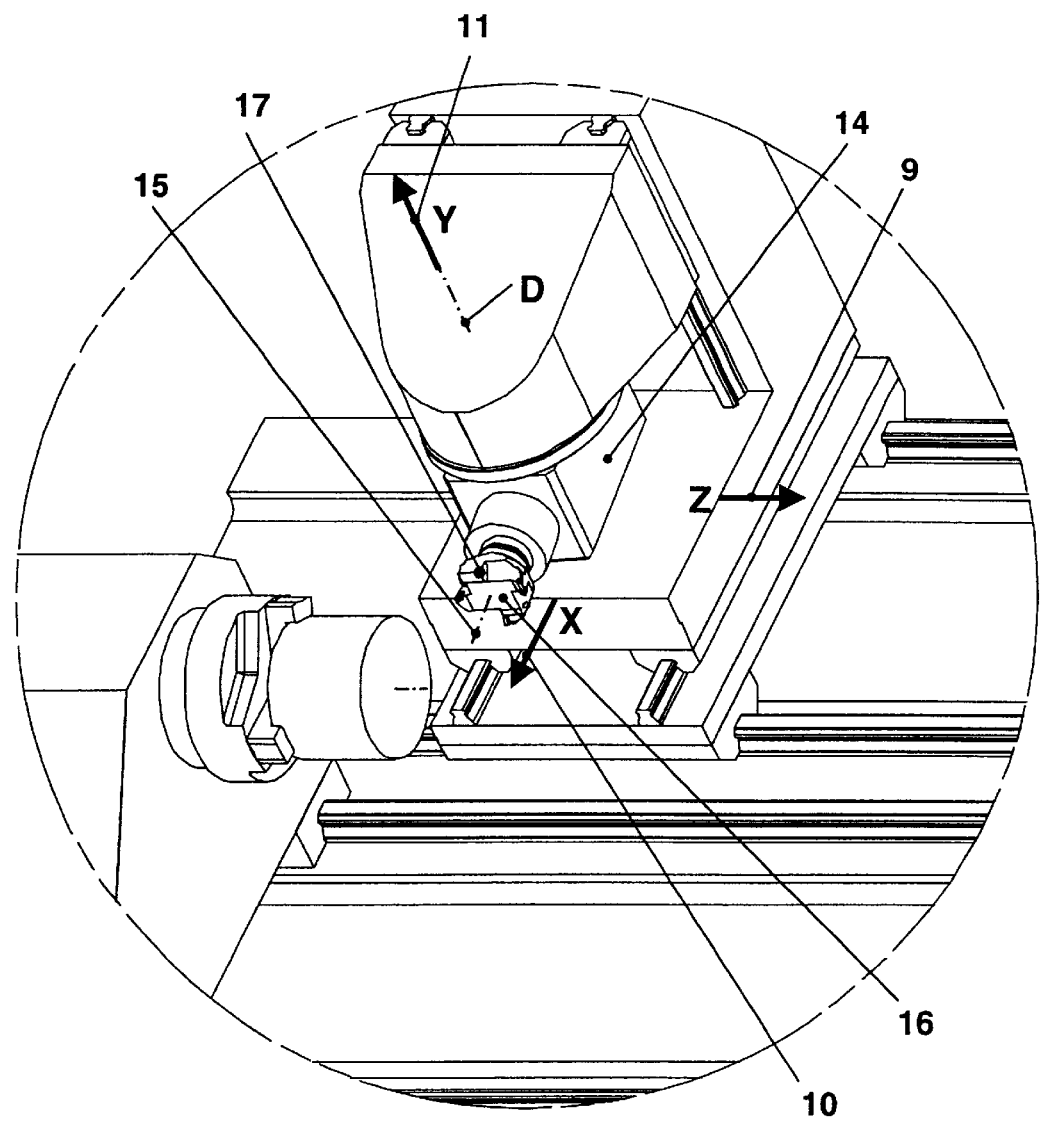
FIG. 2 is a perspective diagrammatic representation of a machining apparatus for turning and milling operations according to the prior art which works according to the prior art method.
Figure 3:
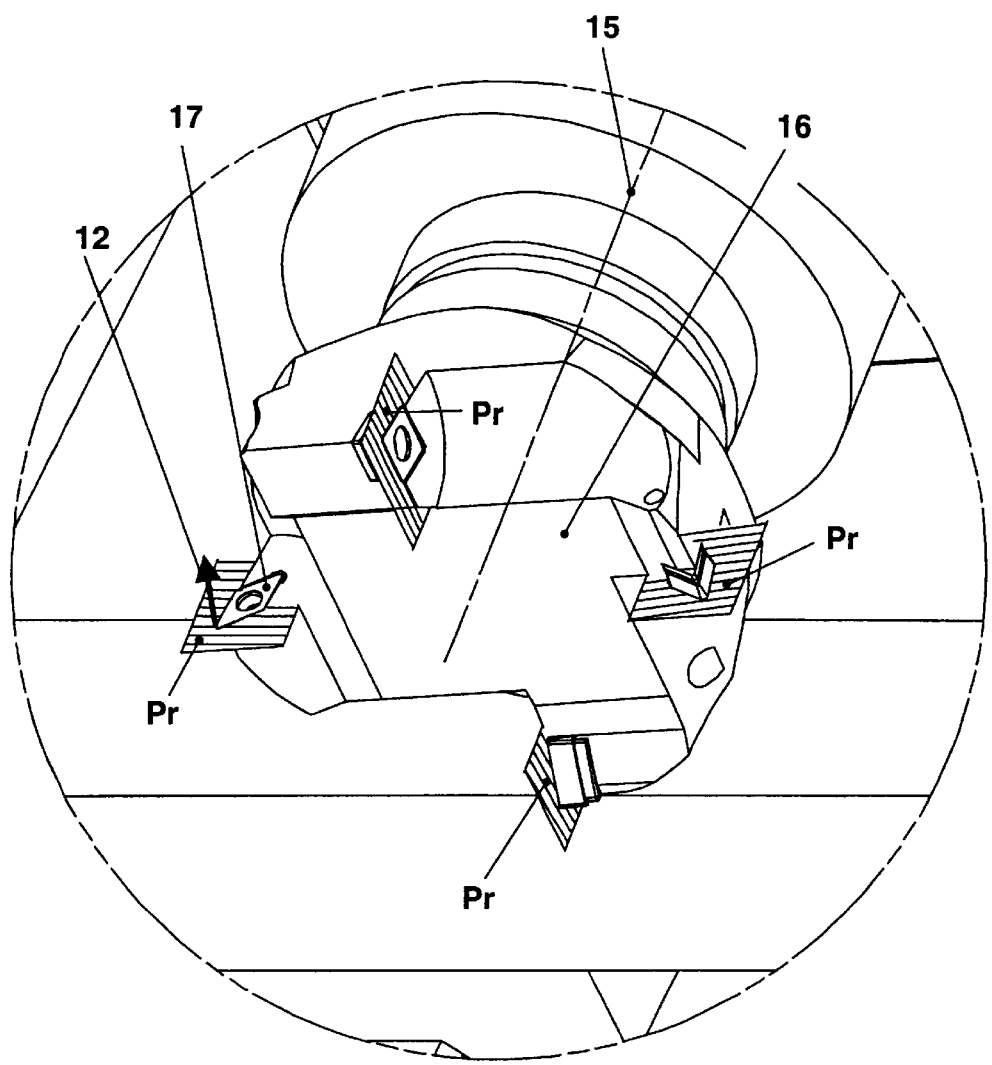
FIG. 3 is an enlarged detail of the prior art machining apparatus according to FIG. 2.

FIGS. 2 and 3 show an inclined-bed machining apparatus in accordance with the prior art, in which machining apparatus milling operations can also be carried out in addition to turning operations. In addition to the basic construction of the machining apparatus in accordance with the inclined-bed lathe according to FIG. 1, this machining apparatus has a milling attachment 14. The milling spindle axis 15 of this milling attachment 14 rotates about a rotary axis D which is pivotable about the Y-axis 11 in the plane formed by the X-axis 10 and the Z-axis 9. In addition, the milling spindle is rotatable about the milling spindle axis 15 in an infinitely variable motor-operated manner. The milling spindle is fitted with a special tool head 16 with which turning work can be carried out. The tool head 16 is fitted with four cutting inserts 17 which are each arranged offset from one another by 90° in such a way that their tool reference planes $P_r$ perpendicular to the assumed cutting direction 12 also each run offset from one another by 90°. The individual cutting inserts 17 are brought into the working position one after the other by rotating the milling spindle about the milling spindle axis 15 by 90°. A slight variation in the setting angle of the cutting inserts 17 which are in use in each case is possible due to the pivoting capacity of the milling spindle about the Y-axis 11 in the plane formed by the X-axis 10 and Z-axis 9. On account of the type of construction of the tool head 16, this variation is only possible to a small extent. Longitudinal turning and facing with one and the same cutting insert 17 is only possible with a few forms of cutting insert. The workpiece accessibility is greatly restricted in the case of such a tool head 16.

Figure 4:
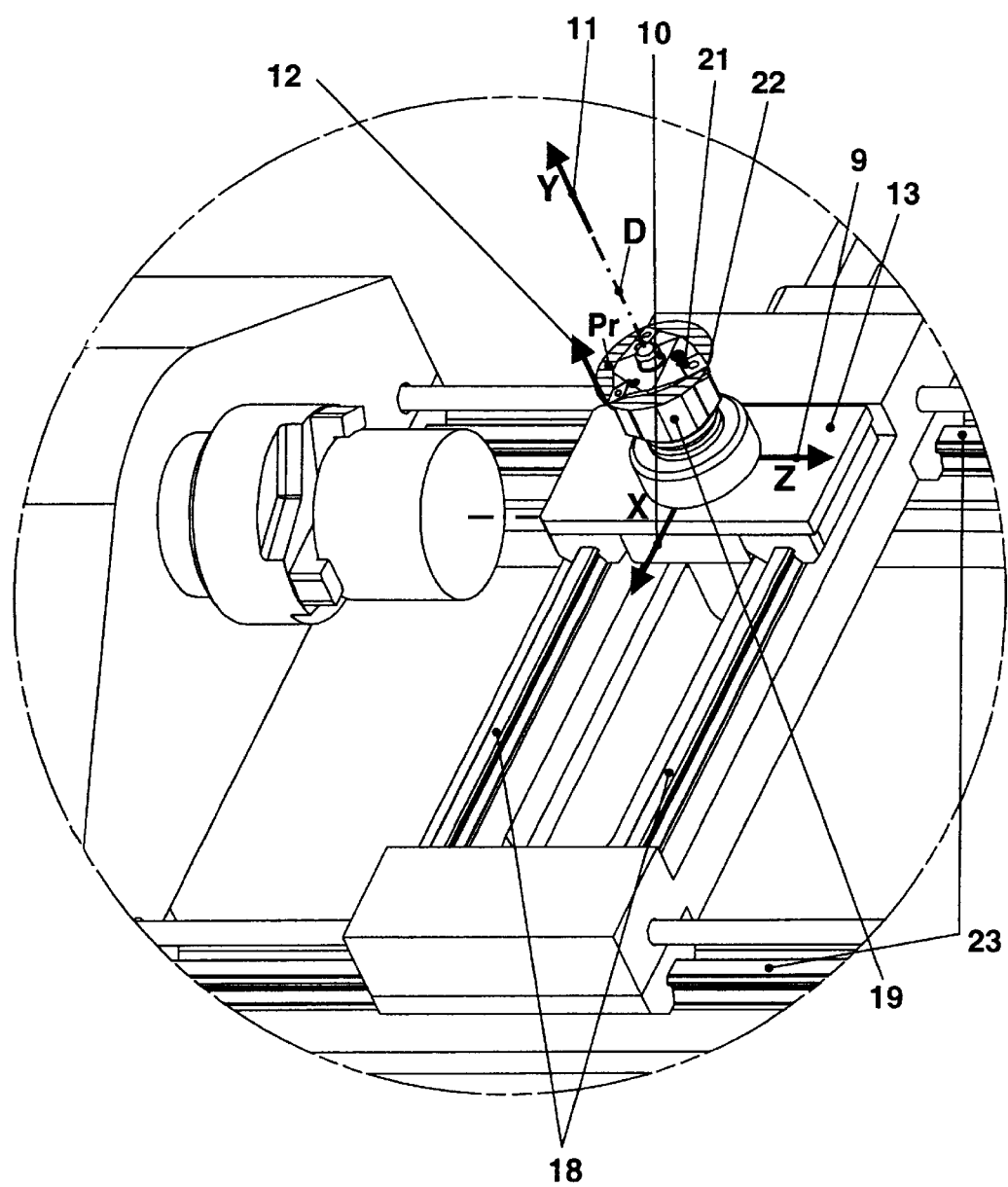
FIG. 4 is a perspective diagrammatic representation of an inclined-bed lathe according to the invention and which works according to the method according to the invention.
Figure 5:
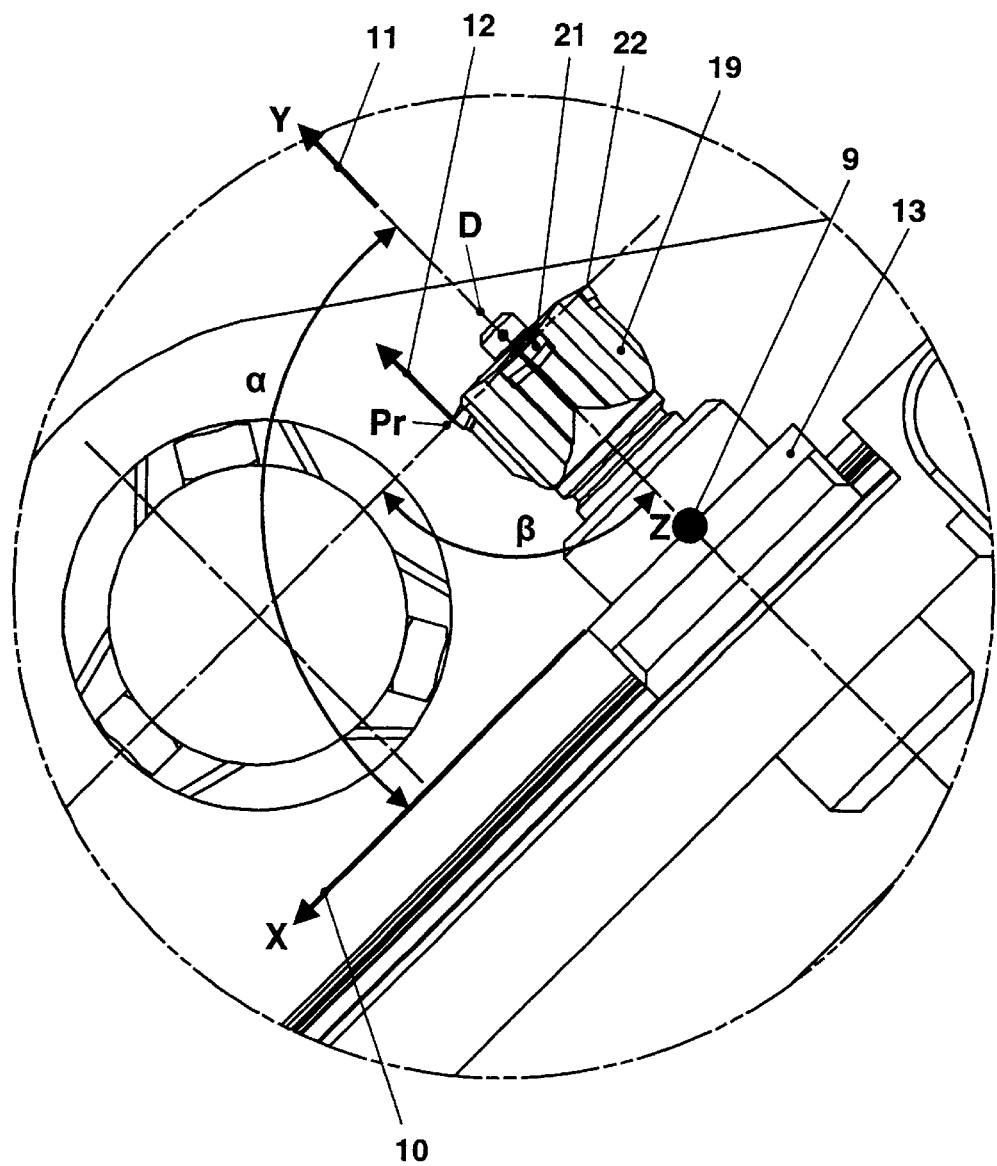
FIG. 5 is an enlarged detail of the inclined-bed lathe according to FIG. 4.

FIGS. 4 and 5 show an inclined-bed lathe in accordance with the invention, having a tool head 19 which, via a corresponding receptacle in a tool slide 13, is traversable in the direction of the X-axis 10 via the guides 18 and in the direction of the Z-axis 9 via the guides 23. The tool head 19 has a rotary axis D which encloses an angle α of 90° with the X-axis 10 and runs perpendicularly to the Z-axis 9 of the lathe. The tool head 19 is rotatable about this rotary axis D in an infinitely variable mechanical manner. The tool head 19 is fitted with three cutting inserts 21, which are arranged in such a way that the active cutting corners 22 of all the cutting inserts 21 lie on a common tool reference plane $P_r$ perpendicular to the assumed cutting direction 12, this tool reference plane $P_r$ running at an angle β of 90° to the rotary axis D of the tool head 19. Due to such an arrangement of the cutting inserts 21 and the infinitely variable rotatability of the tool head 19, the setting angle of the cutting insert 21 in use in each case can be set as desired; in particular one and the same cutting insert 21 with the freely selectable setting angle can be used for both longitudinal turning and facing.

Figure 6:
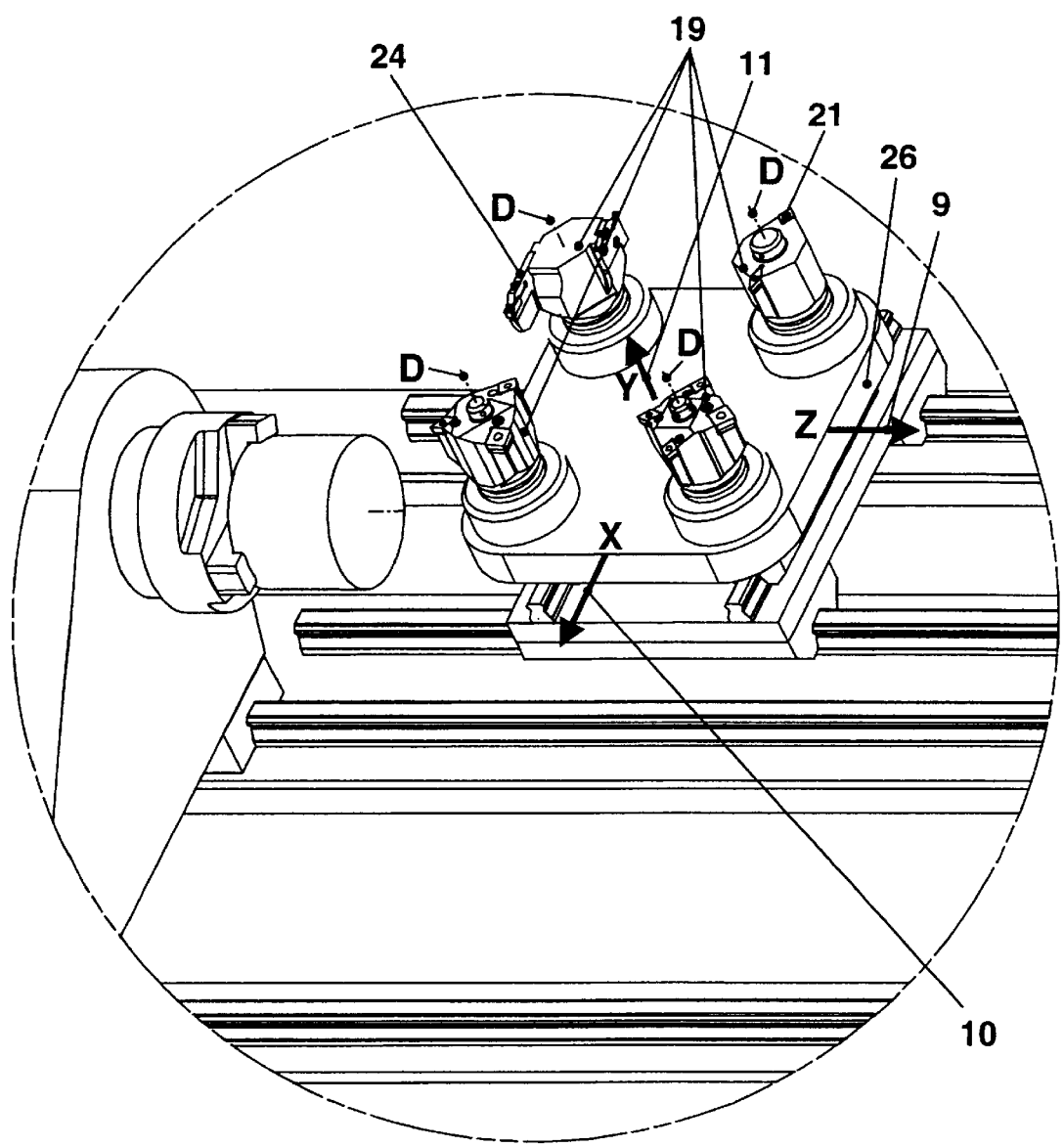
FIG. 6 is a perspective diagrammatic representation of a variant of an inclined-bed lathe according to the invention which works according to the method according to the invention.

FIG. 6 likewise shows an inclined-bed lathe in accordance with the invention, in which a tool turret 26 with receptacles for fitting with four tool heads 19 is provided, and these tool heads 19 can each be brought into use individually. In this way, the lathe can be fitted with a large number of the same or different cutting inserts 21 or tool holders 24 without the mass to be moved in each case becoming too large.

Figure 7:
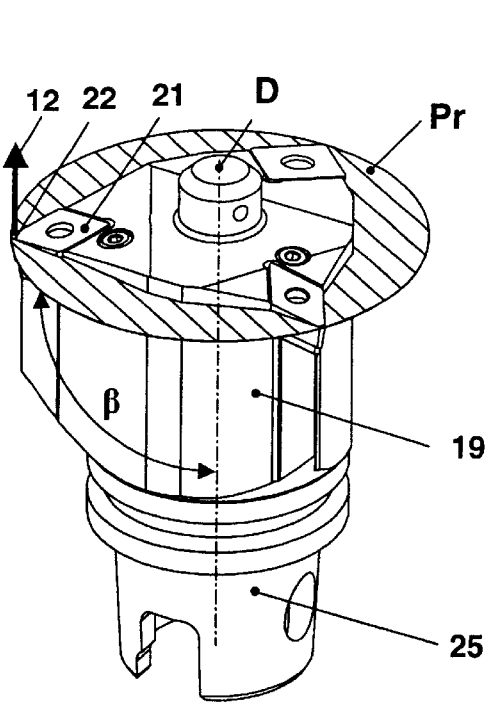
FIG. 7 is a perspective view of a tool head for carrying out the method according to the invention.
Figure 8:
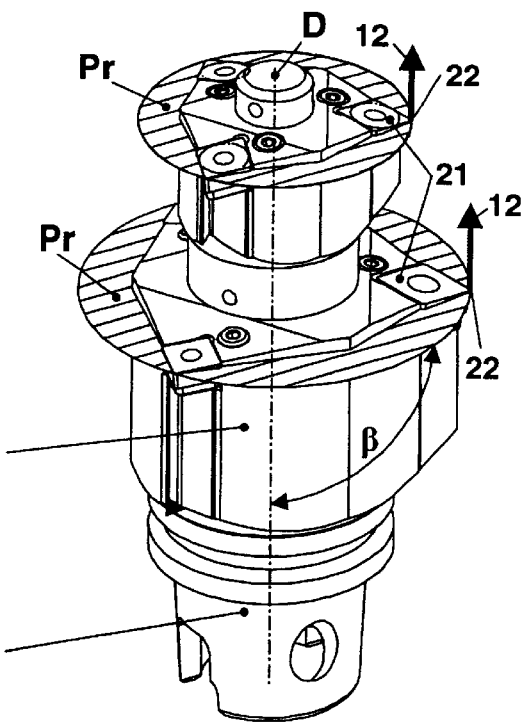
FIG. 8 is a perspective view of a second tool head for carrying out the method according to the invention.
Figure 9:
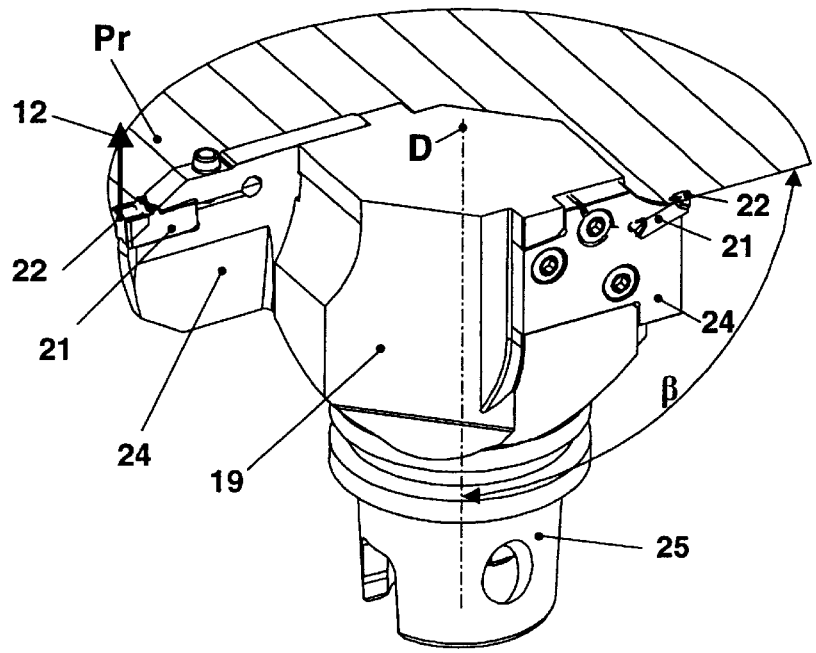
FIG. 9 is a perspective view of a third tool head for carrying out the method according to the invention.

FIGS. 7 to 9 show three different variants of tool heads 19 for carrying out the method according to the invention. The tool head 19 according to FIG. 7 is fitted with three different cutting inserts 21, the tool reference planes $P_r$ of the individual cutting inserts 21 through the active cutting corners 22 perpendicular to the assumed cutting direction 12 coinciding in a common tool reference plane $P_r$ which runs at an angle β of 90° to the rotary axis D of the tool head 19. In the tool head 19 according to FIG. 8, six different cutting inserts 21 are arranged in such a way that the tool reference planes $P_r$ of three cutting inserts 21 through the active cutting corners 22 perpendicular to the assumed cutting direction 12 coincide in a first common tool reference plane $P_r$ at an angle β of 90° to the rotary axis D of the tool head 19, while the tool reference planes $P_r$ of the remaining three cutting inserts 21 through the active cutting corners 22 coincide in a second common tool reference plane $P_r$ which runs at a distance from and parallel to the first common tool reference plane $P_r$.

The tool head according to FIG. 9 is fitted with two tool holders 24 for cutting off with cutting inserts 21, the tool reference planes $P_r$ of the individual cutting inserts 21 through the cutting edges 22 perpendicular to the assumed cutting direction 12 coinciding in a common tool reference plane $P_r$ at an angle β of 90° to the rotary axis D of the tool head 19. All three variants of the tool heads 19 are provided with base parts 25 in the form of a truncated cone with plane-parallel bearing for the releasable, rapid connection and positioning of the tool heads 19 in the receptacle of the tool slide 13.

Figure 10:
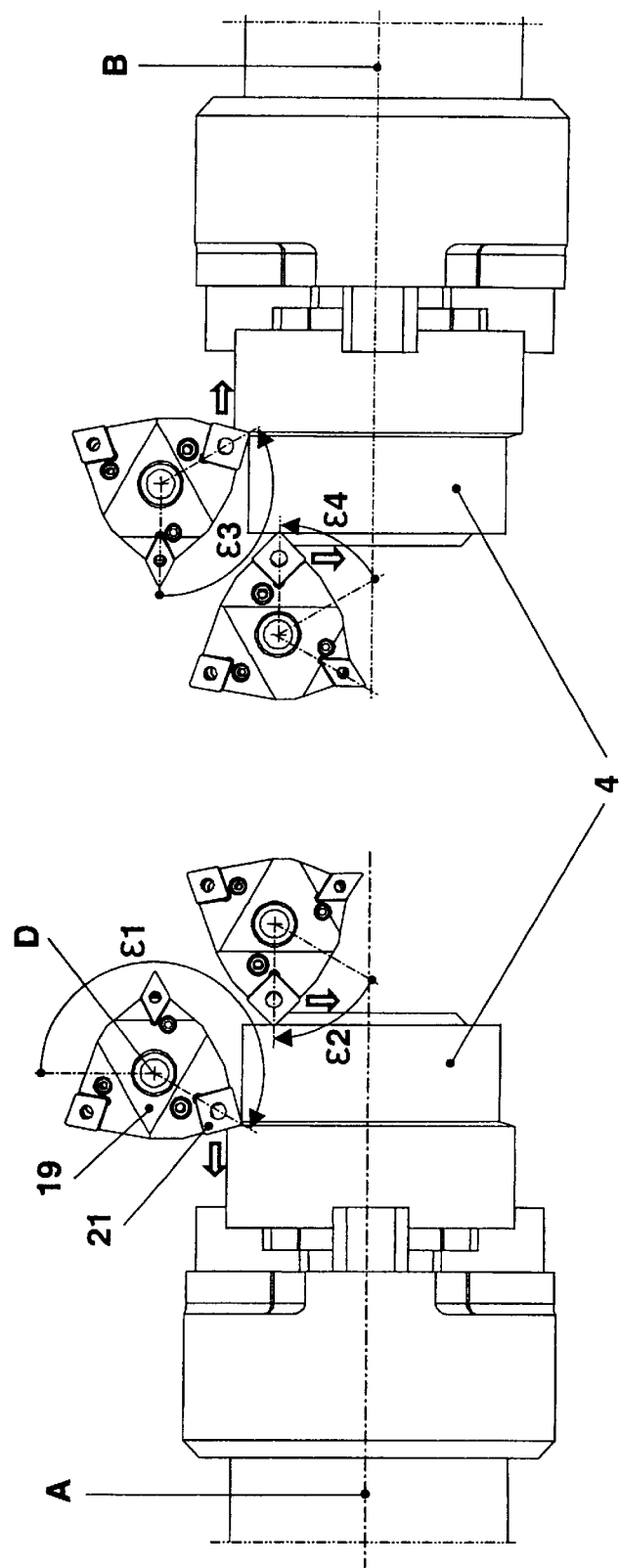
FIG. 10 is a schematic elevational view of a machining example using the method according to the invention.

FIG. 10 shows the basic operating sequence with which, on a lathe having two work spindles A and B, two workpieces 4 are longitudinally turned and faced with a single indexable cutting tip 21 on a tool head 19. The tool head 19 starts with the longitudinal turning of the workpiece 4 on the work spindle A, the active cutting insert 21 having been brought from the zero position into the working position by the angle $\epsilon_1$.

After completion of the longitudinal turning, the active cutting insert 21 is turned further by the angle $\epsilon_2$ and the facing of the workpiece 4 on the work spindle A is carried out in this new position.

After completion of this facing operation, the tool head 19 is turned back by the angle $\epsilon_3$ and carries out the longitudinal turning of the workpiece 4 on the work spindle B with the active cutting insert 21.

After completion of the longitudinal turning on this work spindle, the tool head 19 is turned back further by the angle $\epsilon_4$ and carries out the facing of the workpiece 4 on the work spindle B with the active cutting insert 21.

I claim:
1. A turning method, which comprises:
   providing a lathe or a machining apparatus with a tool head, the tool head being traversable and rotatable about a rotary axis V in the course of a turning operation;
   defining the rotary axis D of the tool head within an angular range α of 45° to 90° relative to the X-axis and perpendicular to the Z-axis of the lathe or machining apparatus;
   providing the tool head with one or more cutting inserts for individual use during the turning operation, and arranged such that each cutting insert has a tool reference plane $P_r$ through in each case identically selected cutting-edge points perpendicularly to an assumed cutting direction in accordance with DIN 6581, the tool reference plane $P_r$ enclosing an angle β of 90° to 135° with the rotary axis D of the tool head; and
   turning a workpiece with a cutting insert on the tool head.
2. The turning method according to claim 1, which comprises providing the tool head with individual tool holders each fitted with one or more cutting inserts.
3. The turning method according to claim 1, which comprises defining the rotary axis D to enclose an angle α of 90° with the X-axis.
4. The turning method according to claim 3, which comprises arranging a plurality of cutting inserts such that the tool reference planes $P_r$ of the individual cutting inserts coincide in a common tool reference plane $P_r$ that encloses an angle β of 90° with the rotary axis D of the tool head.
5. The turning method according to claim 3, which comprises arranging a plurality of cutting inserts such that the tool reference planes $P_r$ of the individual cutting inserts coincide in different, common tool reference planes $P_r$ arranged in parallel one above another with respect to the rotary axis D.
6. The turning method according to claim 1, which comprises providing the machining apparatus with a tool turret accommodating a plurality of tool heads, and selectively bringing individual tool heads into a working position during the turning operation.
7. A tool head assembly translationally disposed on a lathe or machining apparatus, comprising:
   a tool head rotatably disposed about a rotary axis D enclosing an angle α of between 45° and 90° with the X-axis and extending perpendicular to the Z-axis; and
   cutting inserts carried on said tool head for individual use during the turning operation, and arranged such that each cutting insert has a tool reference plane $P_r$ through in each case identically selected cutting-edge points perpendicularly to an assumed cutting direction in accordance with DIN 6581, the tool reference plane $P_r$ enclosing an angle β of 90° to 135° with said rotary axis D of said tool head.
8. A lathe or machining apparatus, comprising a tool head assembly according to claim 7 disposed to traverse during a turning operation and to rotate about the rotary axis D.

* * * * *

UNITED STATES PATENT AND TRADEMARK OFFICE
CERTIFICATE OF CORRECTION

PATENT NO. : 6,715,386 B2
DATED : April 6, 2004
INVENTOR(S) : Johann Maier

It is certified that error appears in the above-identified patent and that said Letters Patent is hereby corrected as shown below:

<u>Title Page,</u>
Item [73], Assignee, should read as follows:
-- CERATIZIT Austria Gesellschaft m.b.H., Reutte (AT) --

Signed and Sealed this

Twenty-fifth Day of May, 2004

JON W. DUDAS
*Acting Director of the United States Patent and Trademark Office*